United States Patent [19]

Levinson

[11] Patent Number: 4,960,623
[45] Date of Patent: Oct. 2, 1990

[54] AUTOMOBILE ELECTRONIC-COMPONENT ANTI-THEFT DEVICE

[76] Inventor: Gerald C. Levinson, 3408 Manhattan Ave., Manhattan Beach, Calif. 90266

[21] Appl. No.: 418,161

[22] Filed: Oct. 6, 1989

[51] Int. Cl.⁵ .......................... B60K 35/00; F41H 3/00
[52] U.S. Cl. ......................................... 428/31; 180/90; 296/70; 428/100; 428/919
[58] Field of Search .................... 428/919, 99, 100, 31; 180/90; 280/752; 296/70; 455/345

[56] References Cited

U.S. PATENT DOCUMENTS

| | | | |
|---|---|---|---|
| 2,351,142 | 6/1944 | Mitchell | 428/919 X |
| 4,248,069 | 2/1981 | Burbank | 455/345 X |
| 4,365,280 | 12/1982 | Crosetti et al. | 428/919 X |
| 4,532,162 | 7/1985 | Neece | 428/919 X |
| 4,584,717 | 4/1986 | Strickland | 455/345 |

Primary Examiner—Henry F. Epstein
Attorney, Agent, or Firm—Gottlieb, Rackman & Reisman

[57] ABSTRACT

An anti-theft device for a car electronic component, such as a car radio, is described. The anti-theft device includes a panel assembly defined by a rectangular surrounding frame and a panel member. The panel member includes a plurality of randomly spaced apertures from which a plurality of electrical wires project. When the device is mounted over a car electronic-component, it creates the illusion that the car electronic component has been removed or stolen, preventing any would-be-thief from breaking into the car.

15 Claims, 2 Drawing Sheets

AUTOMOBILE ELECTRONIC-COMPONENT ANTI-THEFT DEVICE

BACKGROUND

The present invention generally relates to an anti-theft device for a car electronic-component, and more particularly is directed to an anti-theft device which acts as "camouflage" for a car radio that remains in the car, but which is made to simulate the appearance of a stolen or missing radio.

As is well known, theft of car radios has reached epidemic proportions, especially in major cities across the United States. The proficiency of radio thieves has attained a level such that thieves can apparently get into and out of virtually any car and steal the radio in a matter of a few minutes. This unfortunate situation has led to a number of basic preventive steps, such as the use of small signs that are displayed in automobiles, advising potential thieves that there is "no radio", or that "radio already stolen", or words to that effect.

Another basic step is using a portable housing (the "Benzi Box") whereby the entire radio is removed from a cavity in the chassis and taken with the owner when he leaves the car. This method, though preventing the theft of a car radio, is extremely cumbersome and inconvenient since it requires transport of the radio each time the operator leaves his car.

There are also various methods of altering the appearance of a car radio so as to have it appear that a blank panel exists, such as when no radio is installed, or as it would appear when a less expensive or undesirable radio is installed in the car. However, none are designed to give the impression to a would-be thief that the radio has already been stolen and is, therefore, missing from the car. Further, none discloses an anti-theft device securing method readily useable on any type of car electronic device, i.e., such as a radio, as in the present invention.

Accordingly, it would be desireable to provide a car radio anti-theft device which, upon close inspection by a would-be thief, gives the impression that the car has already had its radio removed.

SUMMARY OF THE INVENTION

Generally speaking, in accordance with the invention, a car electronic-component anti-theft device is described. The anti-theft device includes a panel assembly disposed over the car electronic component having randomly spaced apertures with a plurality multicolored electrical wires protruding therefrom. The plurality of multicolored wires creates the illusion that the electronic-component has already been removed from the car.

The panel assembly of the anti-theft device is attached to or mounted over the car electronic component (i.e.—car radio) by a hook and loop assembly, which enables selective attachment to the electronic component.

Accordingly, it is an object of the invention to provide a car electronic-component anti-theft device to be used while the electronic-component is still in the car, which gives the impression that the electronic-component has already been removed from the car.

It is a further object of the invention to provide a car electronic-component anti-theft device which is readily attachable and removable from any type of electronic-component.

Yet another object of the invention is to provide a car electronic-component anti-theft device that creates the impression of an already removed electronic-component.

Still other objects and advantages of the invention will in part be obvious and will in part be apparent from the specification.

The invention accordingly comprises an article of manufacture possessing the features, properties and the relation of elements which will be exemplified in the article hereinafter described, and the scope of the invention will be indicated in the claims.

BRIEF DESCRIPTION OF THE DRAWINGS

For a fuller understanding of the invention, reference is made to the following description taken in connection with the accompanying drawings, in which.

DETAILED DESCRIPTION OF THE PREFERRED EMBODIMENT

Figure 1:
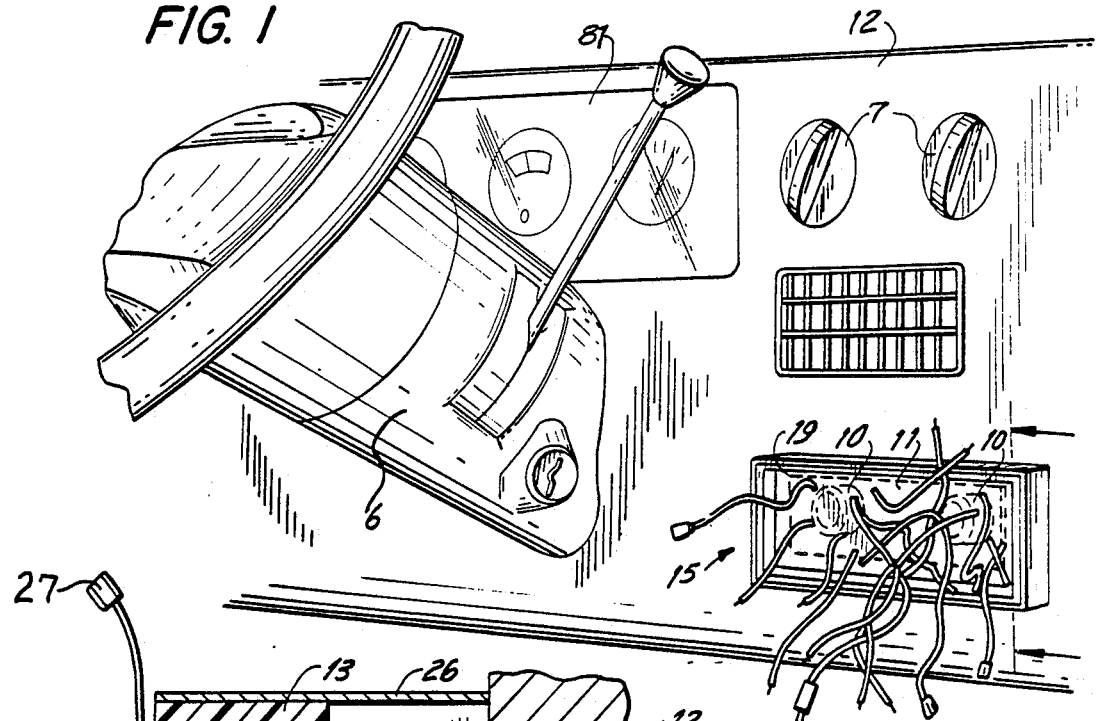
FIG. 1 is a perspective view of the dashboard of a car, illustrating one application of the anti-theft device made in accordance with the invention.
Figure 2:
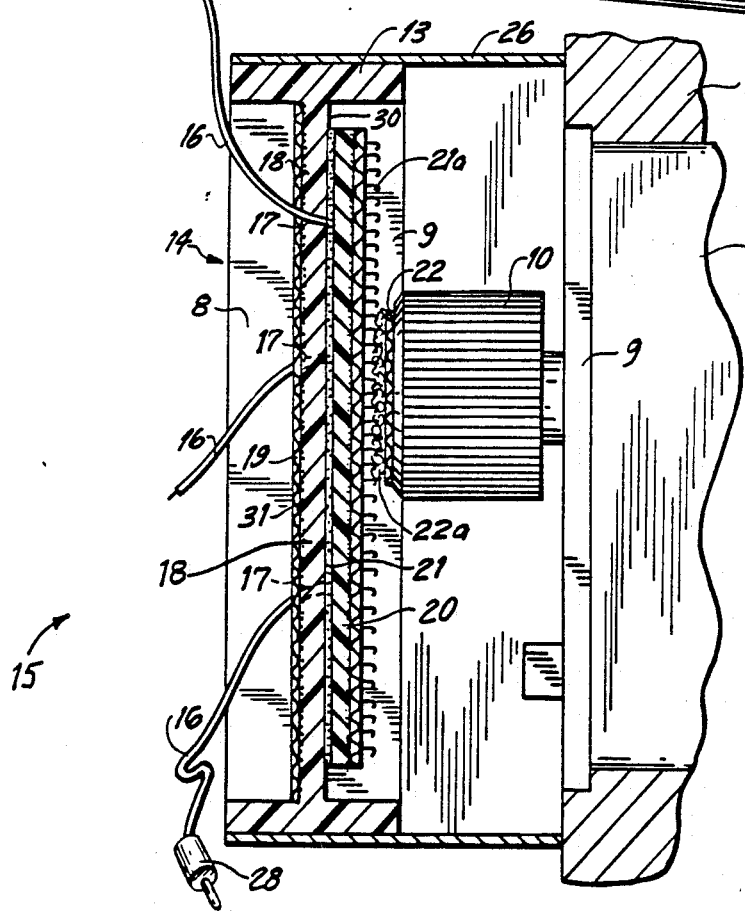
FIG. 2 is a cross-sectional view along line 2—2 of FIG. 1 and illustrates in greater detail the various components of the anti-theft device.

Referring first to FIGS. 1 and 2, an anti-theft device for a car electronic component, such as a car radio, made in accordance with the invention is generally indicated at 15. Anti-theft device 15 is selectively mounted over a car radio 11 that has been pre-installed in a Car dashboard 12. Car dashboard 12 includes a steering column 6, air vents 7, speedometer panel 81 as well as car radio 11, as is generally known in the art. Car radio 11 consists of an exposed front panel 9 and a pair of control knobs 10 projecting from front panel 9 and suitable for adjusting the volume and selecting the desired radio station.

Referring specifically now to FIG. 2 as well as FIG. 1, anti-theft device 15 is more fully described. Anti-theft device 15 includes a panel assembly 14 comprising a rectangular surrounding frame 13 and a rectangular panel 18. Panel 18 includes a rear rectangular surface 31, and a front rectangular surface 30 that faces opposite rearward surface 31. Panel assembly 14 has a t-configuration in cross-section, which defines a rear rectangular compartment 8 and a front rectangular compartment 9 between which panel 18 is disposed.

Panel 18 is formed with a plurality of randomly spaced apertures 17 from which a corresponding plurality of wires 16 rearwardly project. Each of wires 16 are permanently retained at one end thereof in its respective aperture 17. Wires 16 are multicolored, and some of wires 16 include a terminating lug 27 or a terminating socket 28. Thus, projecting wires 16 give the appearance of the remnant of an electronic device, such as a car radio, that had been retained in car dashboard 12.

Optionally, rear surface 31 is provided with a black velvet cover 19 thereover. Velvet cover 19 prevents plurality of apertures 17 (from which plurality of wires 16 project) from being visible to an observer. Also, velvet cover 19 creates a black background or impression, which is usually present if a car radio or the like has been removed from the dashboard of a car.

Still referring to FIG. 2, anti-theft device 15 also includes a rectangular back plate 20 that is sized somewhat smaller than panel 18 of panel assembly 14 and which is permanently disposed along front surface 30 of panel 18. Plate 20 is attached to front surface 30 by a conventional adhesive or glue. When attached to front surface 30 of panel 18, plate 20 substantially covers plurality of apertures 17 formed in panel 18.

In FIG. 2, anti-theft device 15 also includes a first adhesive strip 21 sized to fit over the front surface 30 of a back plate 20. First adhesive strip 21 is attached along its rear surface to plate 20 by means of a reusable adhesive and includes a plurality of hook elements 21a disposed along its forward surface. As will be described hereinbelow, plurality of hook elements 21a are used for selectively and releasibly mounting anti-theft device 15 over car radio 11.

In order to attach anti-theft device 15 to car radio 11, as illustrated in FIG. 1, a pair of second adhesive circles 22 are placed over radio knobs 10 (see FIG. 2). Adhesive circles 22 have a front surface applied with a reusable adhesive suitable for selectively attaching circles 22 to knobs 10 and a rear surface provided with a plurality of loop elements 22a. Loop elements 22a of circles 22 are suitable for selectively and matingly engaging with hook elements 21a of strip 21.

Before positioning anti-theft device 15 over car radio 11 (for attachment thereto), it is necessary to first place anti-theft device 15 inside of an adjustment sleeve 26. Adjustment sleeve 26 is typically made of a cardboard material, has a substantially rectangular configuration and is sized such that anti-theft device 15, specifically panel assembly 14, fits snugly therewithin, as illustrated in FIG. 2. After placing anti-theft device 15 inside of sleeve 26, the entire assembly is positioned over car radio 11, as shown in FIG. 1. By pressing against rear surface 31 of panel 18, hook members 21a of adhesive strip 21 will selectively mate with loop members 22a of circles 22, as shown in FIG. 2. As a result, anti-theft device 15 is securely fastened over car radio 11.

If sleeve 26 is not flush with the rearward most surface of anti-theft device 15, a pair of conventional scissors may be used to cut away any excess of sleeve 26. This enables anti-theft device 15 to be positioned flush within sleeve 26.

When anti-theft device 15 is appropriately positioned over car radio 11, the entire assembly will give the appearance that radio 11 has already been removed from dashboard 12. Thus, a would-be-thief would less likely want to break into the car since it would appear that the radio has already been stolen therefrom.

Figure 4:
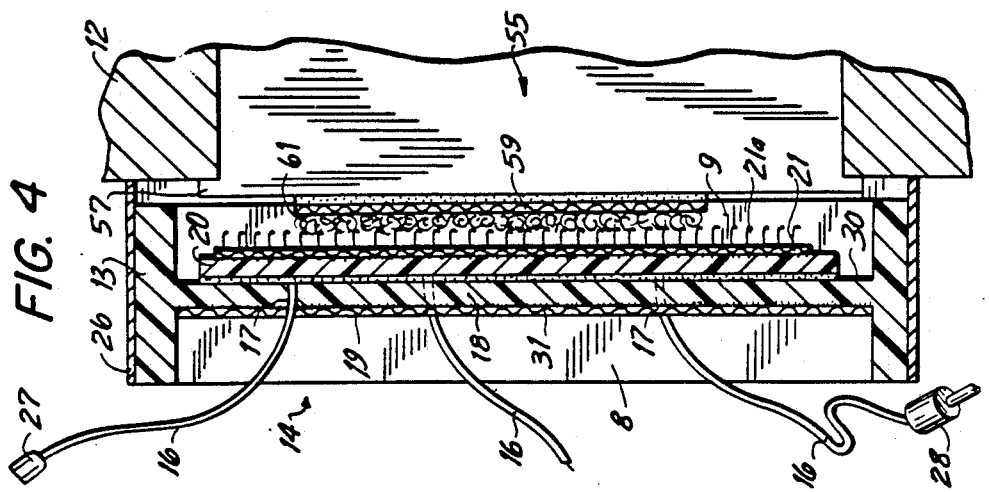
FIG. 4 is a cross-sectional view, substantially similar to the view shown in FIG. 2, illustrating application of the anti-theft device shown in FIG. 3 in connection with a digital radio retained in the dashboard of a car.
Figure 3:
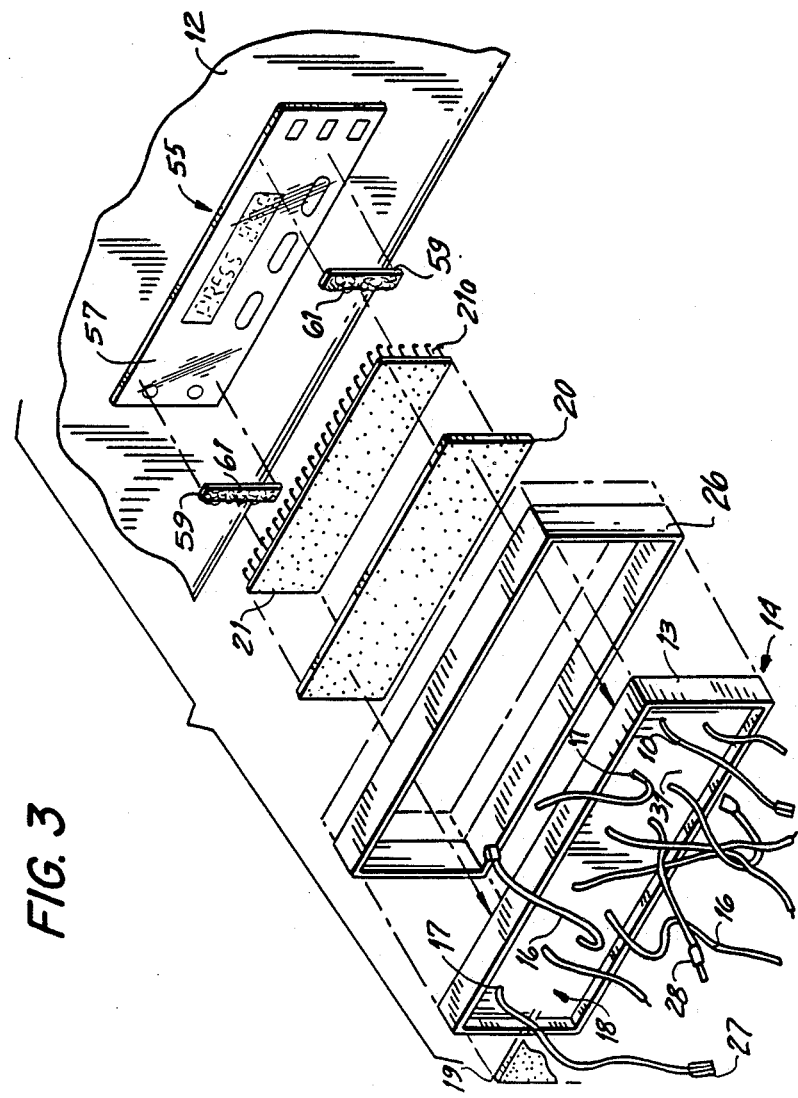
FIG. 3 is an exploded perspective view of a second embodiment of the device, showing the various individual components thereof.

Referring now to FIGS. 3 and 4, anti-theft device 15 is shown mounted on a car digital radio 55. Car digital radio 55 includes a front panel 57 which projects slightly rearward of dashboard 12. Panel 57 includes a various number of buttons, which are used for operating radio 55.

In order to attach anti-theft device 15 to radio 55, a pair of second adhesive strips 59 are used. Strips 59 include a reusable adhesive on the front surface thereof and a plurality of loop members 61 on the rear surface thereof. Loop members 61 are suitable for selectively and matingly engaging with hook members 21a of first adhesive strip 21.

After strips 59 are placed on and adhered to panel 57 of digital radio 55, anti-theft device 15 is positioned appropriately over radio 55, as illustrated in FIGS. 3 and 4. By pressing against rear surface 31 of panel 18, hook members 21a of First strip 21 and loop members 61 of second strip 59 selectively engage, thereby securely mounting anti-theft device 15 over radio 55.

As with the embodiment shown in FIGS. 1 and 2, portions of outer cardboard sleeve 26 may project rearwardly beyond the rearward most edge of device 15. Therefore, in order to customize sleeve 26, a pair of scissors is used to cut off any excess. As a result, anti-theft device 15 will give the appearance to the would-be-thief that the car radio has already been removed or stolen.

Although the anti-theft device in accordance with the invention is shown in the embodiment as suitable for a substantially rectangular car radio, the shape and size of the device may be modified appropriately to cover any size or configured car radio.

Although a hook and loop fabric assembly is used for attaching the anti-theft device to the panel of the radio, other attaching means may be used without departing from the inventive concept.

Finally, while only illustrated with respect to a car radio, the anti-theft device of the invention is suitable for use in connection with other car electronic components, such as a car tape player or car CD player.

It will thus be seen that the objects set forth above, among those made apparent from the preceding description, are efficiently attained and, since certain changes may be made in the above device without departing from the spirit and the scope of the invention, it is intended that the subject matter in the above description and shown in the accompanying drawings shall be interpreted as illustrative and not in a limiting sense.

It is also to be understood that the following claims are intended to cover all the generic specific features of the invention herein described and all statements of the scope of the invention which, as a matter of language, might be said to fall therebetween.

What is claimed is:

1. An anti-theft assembly for a car electronic component disposed in a dashboard of a car comprising:
   means for substantially covering said car electronic component;
   means for selectively mounting said covering means over said car electronic component; and
   a plurality of wire elements projecting from said covering means.

2. The assembly of claim 1, wherein said covering means comprises a panel assembly sized to substantially cover said car electronic component.

3. The assembly of claim 2, wherein said panel assembly comprises a panel member and a surrounding frame.

4. The assembly of claim 3, wherein said panel member includes a plurality of apertures for retaining said plurality of projecting wires.

5. The assembly of claim 4, wherein said wires are multicolored.

6. The assembly of claim 5, wherein at least one of said plurality of wires includes a terminating lug and wherein at least another of said plurality of wires includes a terminating socket.

7. The assembly of claim 1, wherein said mounting means comprises first means attached to said covering means and second means attached to said car electronic component, said first means being selectively connectable to said second means.

8. The assembly of claim 7, wherein said first means comprises at least a first strip containing a plurality of hook members and said second means comprises at least a second strip containing a plurality of loop members, said hook members and said loop members being selectively engageable to mount said covering means to said car electronic component.

9. The assembly of claim 8, wherein said at least a second strip comprises a pair of strips.

10. The assembly of claim 9, wherein said pair of strips are said to attach to a corresponding pair of control knobs of said car electronic component.

11. The assembly of claim 1, further including sleeve means for retaining said covering means.

12. The assembly of claim 11, wherein said sleeve means may be adjusted in size for customizing said covering means to said car electronic component.

13. The assembly of claim 4, further including means for hiding said apertures.

14. The assembly of claim 13, wherein said hiding means comprises a velvet cover.

15. A method for preventing the theft of a car electronic component disposed in a dashboard of a car comprising:
   covering said car electronic component with a panel assembly so that said car electronic component is substantially hidden from view;
   selectively mounting said panel assembly over said car electronic component; and
   projecting a plurality of wires from said panel assembly to give the appearance that said car electronic component has been removed from said dashboard of said car.

* * * * *